(12) United States Patent
Guntoro

(10) Patent No.: US 11,216,721 B2
(45) Date of Patent: Jan. 4, 2022

(54) METHOD FOR CALCULATING A NEURON LAYER OF A MULTI-LAYER PERCEPTRON MODEL WITH SIMPLIFIED ACTIVATION FUNCTION

(71) Applicant: Robert Bosch GmbH, Stuttgart (DE)

(72) Inventor: Andre Guntoro, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 361 days.

(21) Appl. No.: 16/328,791

(22) PCT Filed: Sep. 4, 2017

(86) PCT No.: PCT/EP2017/072042
§ 371 (c)(1),
(2) Date: Feb. 27, 2019

(87) PCT Pub. No.: WO2018/046415
PCT Pub. Date: Mar. 15, 2018

(65) Prior Publication Data
US 2019/0205734 A1     Jul. 4, 2019

(30) Foreign Application Priority Data
Sep. 7, 2016   (DE) .................. 102016216944.0

(51) Int. Cl.
*G06N 3/04* (2006.01)
*G06N 3/063* (2006.01)
*G06F 7/48* (2006.01)

(52) U.S. Cl.
CPC ......... *G06N 3/0481* (2013.01); *G06F 7/4824* (2013.01); *G06N 3/063* (2013.01)

(58) Field of Classification Search
CPC ..... G06N 3/0481; G06N 3/063; G06F 7/4824
See application file for complete search history.

(56) References Cited

U.S. PATENT DOCUMENTS

| 2003/0187567 A1* | 10/2003 | Sulatisky ............ F02D 41/1405 |
| | | 701/104 |
| 2015/0269480 A1* | 9/2015 | Levi ........................ G06N 3/049 |
| | | 706/25 |
| 2015/0278680 A1 | 10/2015 | Annapureddy et al. |

FOREIGN PATENT DOCUMENTS

JP          H03235723 A        10/1991

OTHER PUBLICATIONS

Tsai, et al., "A Hardware-Efficient Sigmoid Function with Adjustable Precision for a Neural Network System", IEEE Transactions on Circuits and Systems, vol. 62, No. 11, Nov. 2015 (Year: 2015).*

(Continued)

*Primary Examiner* — Tsu-Chang Lee
(74) *Attorney, Agent, or Firm* — Norton Rose Fulbright US LLP; Gerard Messina

(57) ABSTRACT

A method for calculating a neuron layer of a multi-layer perceptron model that includes a permanently hardwired processor core configured in hardware for calculating a permanently predefined processing algorithm in coupled functional blocks, a neuron of a neuron layer of the perceptron model being calculated with the aid of an activation function, the activation function corresponding to a simplified sigmoid function and to a simplified tan h function, the activation function being formed by zero-point mirroring of the negative definition range of the exponential function.

20 Claims, 5 Drawing Sheets

(56) References Cited

OTHER PUBLICATIONS

Namin et al., "Efficient Hardware Implementation of the Hyperbolic Tangent Sigmoid Function", 2009 IEEE International Symposium on Circuit and Systems, May 24-27, 2009 (Year: 2009).*
Moerland et al., "Neural Network Adaptations to hardware implementation", IDIAP-RP 97-17, Jan. 1997 (Year: 1997).*
Woodura Mitsumi: "Mounting! Artificial Intelligence", Electric Lettter, May 10, 2016, 1st Ed., pp. 012-015. [English version is not available—see Office Action issued by JPO].
Hirato, et al.: "Data Scientist training Manual. Machine Learning Basics", Tech, Bulletin, (2015) Publ. Gijutsuhyoronsha Ltd., 1st Ed., pp. 71-73. [English vesrion is not availbal, see Office Action issuef by JPO].
Office Action issued in corresponding Japanese Patent Application No. JP 2019-533671 dated Apr. 2, 2020.
International Search Report for PCT/EP2017/072042, dated Dec. 12, 2017.
Eppler W et al., "High Speed Neural Network Chip for Trigger Purposes in High Energy Physics", Design, Automation and Test in Europe, Proceedings Paris, France, 1998, Los Alamitos, CA, USA, Comput. Soc.US, 1998, pp. 108-115, XP010268412.
Richard Fiifi Turkson et al., "Artificial Neural Network Applications in the Calibration of Spark-Ignition Engines: An Overview", Engineering Science and Technology, An International Journal, vol. 19, No. 3, 2016, pp. 1346-1359, XP055420859.
Basterretxea K et al., "Approximation of Sigmoid Function and the Derivative for Hardware Implementation of Artificial Neurons", Proceedings: Circuits Devices and Syst, Institution of Electrical Engineers. Stenvenage, GB, vol. 151, No. 1, 2004, pp. 18-24, XP006021283.
Che-Wei Lin et al., "A Digital Circuit Design of Hyperbolic Tangent Sigmoid Function for Neural Networks", Circuits and Systems, International Symposium on, Piscataway, NJ, USA, 2008, pp. 856-859, XP031392108.
Gomar Shaghayegh et al., "Precise Digital Implementations of Hyperbolic Tanh and Sigmoid Function", 2016 50th Asilomar Conference on Signals, Systems and Computers, 2016, pp. 1586-1589, XP033072819.

\* cited by examiner
METHOD FOR CALCULATING A NEURON LAYER OF A MULTI-LAYER PERCEPTRON MODEL WITH SIMPLIFIED ACTIVATION FUNCTION

FIELD OF THE INVENTION

The present invention relates to the calculation of functional models in a separate hardwired model calculation unit, in particular, for calculating multi-layer perceptron models.

BACKGROUND INFORMATION

Functions of technical systems controls such as, for example, internal combustion engines, electric drives, storage batteries and the like are frequently implemented using models, which represent a mathematical copy of the real system. However, physical models lack the requisite calculation accuracy, in particular, in the case of complex correlations, and it is generally difficult in the case of modern processing capacities to calculate such models within the real time demands required for a control unit. For such cases, it is envisaged to use data-based models, which describe the correlations between an output variable and input variables exclusively on the basis of training data obtained with the aid of a test bench or the like. Data-based models are particularly suited for modeling complex correlations, in which multiple input variables, between which interrelations exist, are suitably taken into consideration in the model. The modeling, with the aid of data-based models, also offers the possibility of supplementing the model by adding individual input variables.

Data-based functional models are generally based on a large number of nodes in order to achieve a modeling accuracy sufficient for the respective application. Due to the high number of nodes, a high processing capacity is required for calculating a model value using a data-based functional model such as, for example, a Gauss process model or a multi-layer perceptron model. Thus, in order to be able to calculate such a data-based functional model in a control unit application in real time, model calculation units based on a hardware configuration may be provided.

SUMMARY OF THE INVENTION

According to the present invention, a method is provided for calculating a neuron layer of a multi-layer perceptron model that includes a permanently hardwired processor core configured in hardware for calculating a permanently predefined processing algorithm in coupled functional blocks according to the description herein, as well as a model calculation unit, a control unit and a use of the control unit according to the other descriptions herein.

Additional embodiments are also specified and described herein.

According to a first aspect, a method is provided for calculating a neuron layer of a multi-layer perceptron model that includes a permanently hardwired processor core configured in hardware for calculating a permanently predefined processing algorithm in coupled functional blocks, a neuron or neuron layer of the perceptron model being calculated with the aid of an activation function, the activation function including a simplified sigmoid function and/or a simplified tan h function, the simplified sigmoid function and tan h function being formed by zero-point mirroring of the negative definition range of an exponential function.

One idea of the aforementioned method is to provide a calculation rule for calculating a simplification of the sigmoid function or of the tan h function as the entire activation function or as part of an activation function in a hardware-based calculation unit. The calculation rule is intended to utilize, in particular, merely the exponential function as a special function and otherwise to use only multiplications and additions in order to avoid a time-consuming and resource-consuming calculation of a division. This makes it possible to utilize a hardware calculation unit suitable for calculating a multi-layer perceptron model without providing additional operational blocks. To achieve this, the sigmoid function or the tan h function may be calculated by utilizing the zero-point mirroring of the negative definition range of the exponential function and by utilizing easily read-out sign bits of the value to be acted on with the activation function.

In addition, an output variable may be calculated for each neuron for a neuron layer of the perceptron model that includes a number of neurons as a function of one or of multiple input variables of an input variable vector, of a weighting matrix having weighting factors and of an offset value predefined for each neuron, a sum of the values of the input values weighted with a weighting factor determined by the neuron and the input variable being acted on by the offset value predefined for the neuron, in particular, added, and the result being transformed with the activation function in order to obtain the output variable for the neuron.

It may be provided to select the simplified sigmoid function or the simplified tan h function as the activation function in accordance with a variable.

It may be provided that a functional value of the simplified sigmoid function is calculated for a value by calculating an exponential function based on a negative absolute value of the value, the functional value being calculated in the case of a positive sign of the value as a sum of “1” and of the product of “−0.5” and of the result of the exponential function, and as the product of “0.5” and of the result of the exponential function in the case of a negative sign. In this way, the result of the exponential function is multiplied by 0.5 and acted on with the result of a step function.

Alternatively, a functional value of the simplified tan h function may be calculated for a value by calculating an exponential function based on a negative absolute value of the value, the functional value being calculated in the case of a positive sign of the value as a sum of “1” and of the negative result of the exponential function, and as a sum of “−1” and of the result of the exponential function in the case of a negative sign of the value. In this way, the simplified tan h function is defined by zero-point mirroring of the negative definition range of the exponential function and by subsequent application of a sign function.

According to another aspect, a model calculation unit is provided for calculating a neuron layer of a multi-layer perceptron model that includes a permanently hardwired processor core configured in hardware for calculating a permanently predefined processing algorithm in coupled functional blocks, the processor core being configured to calculate an output variable for each neuron for a neuron layer of a multi-layer perceptron model having a number of neurons as a function of one or multiple input variables of an input variable vector, of a weighting matrix having weighting factors and of an offset value predefined for each neuron, a sum of the values of the input variables weighted with a weighting factor determined by the neuron and the input variable and with the offset value predefined for the neuron being calculated for each neuron, and the result being transformed with an activation function in order to obtain the output variable for the neuron, the activation function including a simplified sigmoid function or a simplified tan h function and being calculated using a zero-point mirroring of the negative definition range of the exponential function acted on by the result of a step function or sign function.

The processor core may also include a state machine, a memory for storing the one or multiple input variables of the input variable vector, the weighting matrix, the offset values predefined for each neuron and the output values for each neuron, additionally, one or multiple processing operation blocks, in particular, a MAC block and an activation function calculation block.

The processor core may also be configured in a surface area of an integrated chip.

According to another aspect, a control unit that includes a microprocessor and the aforementioned model calculation unit, is provided. The control unit may be configured, in particular, as an integrated circuit.

According to another aspect, a use of the aforementioned control unit is provided as a control unit for controlling an engine system in a motor vehicle.

Specific embodiments are discussed in greater detail below with reference to the appended drawings.

DETAILED DESCRIPTION

Figure 1:
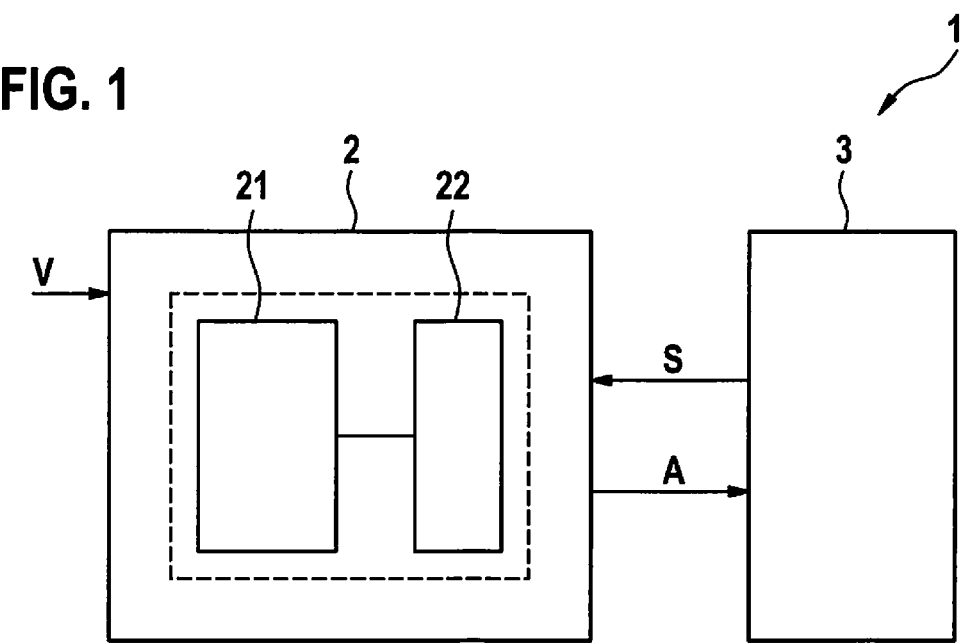
FIG. 1 schematically shows a representation of a control unit to be used for an engine system in a motor vehicle.

FIG. 1 shows by way of example a schematic representation of a control unit 2 for an engine system 1 that includes an internal combustion engine 3 as a technical system to be controlled.

Control unit 2 includes a microprocessor 21 and a model calculation unit 22, which may be configured as separate components or in an integrated manner in separate surface areas on a chip. Model calculation unit 22 represents, in particular, a hardware circuit, which may be structurally separate from a processor core of microprocessor 21.

Model calculation unit 22 is essentially hardwired and accordingly is not configured like microprocessor 21 to execute a software code, and therefore executes a variable function predefined by software. In other words, no processor is provided in model calculation unit 22, so that the model calculation unit is not operable using a software code. Focusing on a predefined model function allows for a resource-optimized implementation of such a model calculation unit 22. With its integrated configuration, model calculation unit 22 may be surface-optimized, which also allows for rapid calculations.

Control unit 2 is used essentially to process sensor signals S or sensor variables that are detected by a sensor system in internal combustion engine 3 and/or to process external specifications V and to cyclically apply values of one or multiple corresponding control variables A to internal combustion engine 3 in fixed predefined time intervals, i.e., periodically within a cycle time of, for example, between 1 ms and 100 ms, or with angular synchronism (synchronously relative to the position of a crankshaft), as a function of a crankshaft angle of an operated internal combustion engine so that the internal combustion engine is operable in a known manner.

Figure 2:
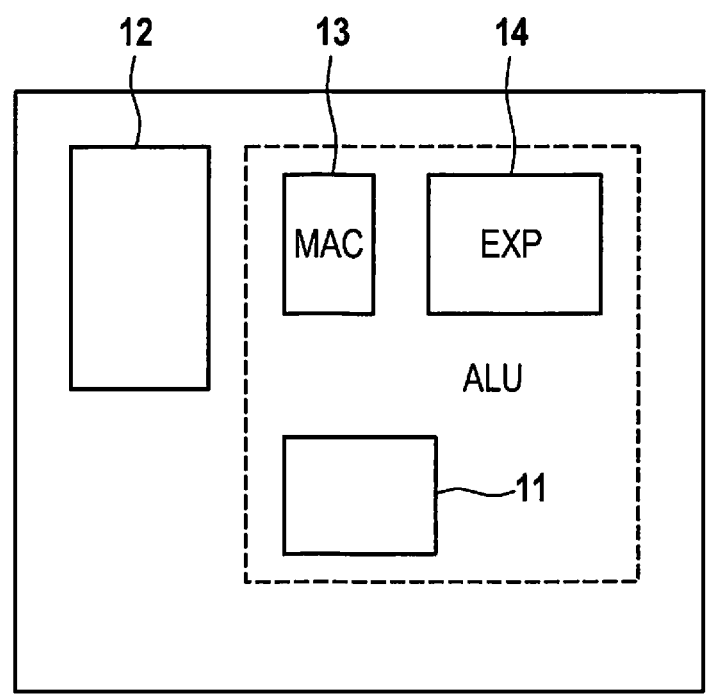
FIG. 2 schematically shows a representation of a model calculation unit as part of the control unit.

A model calculation unit 22 is depicted in detail in FIG. 2. Model calculation unit 22 includes a state machine 11, a memory 12 and one or multiple operation blocks, which include, for example one or multiple MAC blocks 13 (MAC: Multiply-ACcumulate, for fixed point calculation or floating point calculation) and an activation function calculation block 14 for calculating an activation function. State machine 11 and the one or multiple operation blocks 13, 14 form a processor core ALU of model calculation unit 22. The operation blocks may include in addition to or alternatively to the MAC block, a multiplier block and an addition block.

Values of input variables stored with the aid of state machine 11 in an input variable memory area of memory 12 may be offset by repeated loop calculations in order to obtain intermediate variables or output variables, which are written into a corresponding output variable memory area of memory 12.

State machine 11 is configured to calculate a single neuron layer of a multi-layer perceptron model. State machine 11 may be described based on the following pseudocodes:

```
/*input transformation */
for (k=0; k<p7; k++) {
  ut[k] = u[k] * p1[k] + p2[k];
}
/* loop calculation */
for (j=p8; j<p6; j++) {
  i = j * p7;
  t = p3[j];
  for(k=0; k<p7; k++) {
    t += V[i+k} * ut[k];
  }
  switch (cfg_activation_function) {
    case 1:
      e= (t>=0.0f) ? t : 0.0f; // bend function
      break;
    case 2: //sigmoid function
      e = sigmoid(t);
      break;
    case 3: // tanh function
      e = tanh(t);
      break;
    default: // linear function
      e = t;
  }
  y[j] = e;
}
/* output transformation */
for (k=0; k<p6; k++) {
  z[k] = y[k] * p4[k] + p5[k];
}
``` with p7: number of input variables of the input variable vector as index value p8: minimum index value or predefined start index for the number of neurons
p6: number of neurons as index value
p3: offset value
p1, p2: variables for the input transformation
p4, p5: variables for the output transformation The following calculation may be carried out with the aid of the aforementioned pseudocode for each neuron of the neuron layer to be calculated:

$$y[j] = act(p3[j] + \Sigma_{k=0}^{p7-1} v_{j,k} * ut[k]) \text{ for } j=0 \ldots p6-1$$

Figure 3:
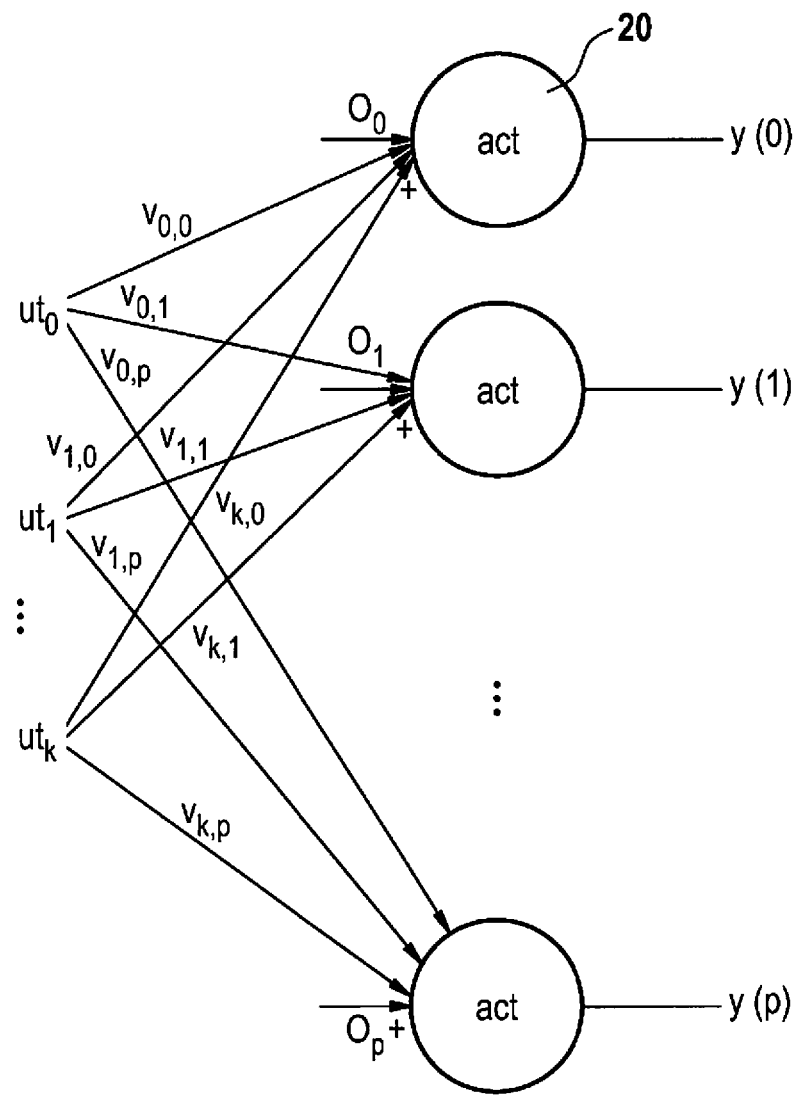
FIG. 3 schematically shows a representation of a neuron layer of an MLP model.
Figure 4A:
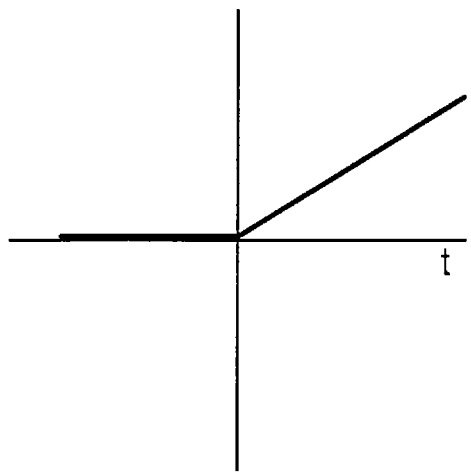
FIGS. 4a, 4b, 4c and 4d show representations of possible activation functions.
Figure 4B:
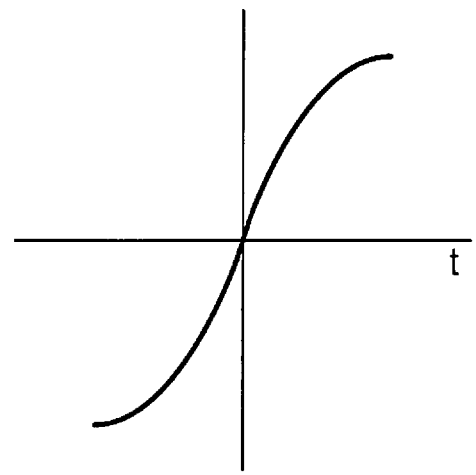
Figure 4C:
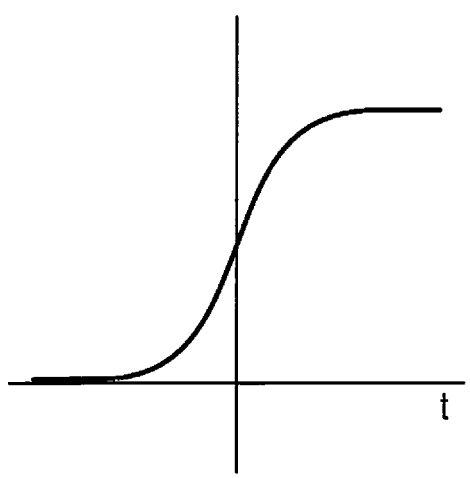
Figure 4D:
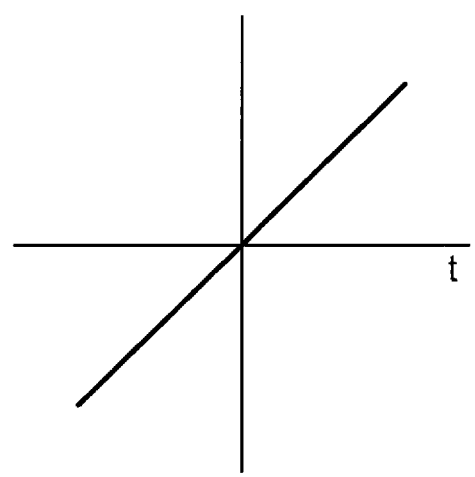

This represents a calculation for a neuron layer of a multi-layer perceptron model, as is depicted in FIG. 3.

FIG. 3 shows a neuron layer of multiple neurons 20, to which values of input variables of an input variable vector $ut_0 \ldots ut_{p6-1}$ are fed. The values of the input variables are weighted with the aid of a corresponding predefined weighting matrix of weighting factors $v_{0 \ldots p7-1.0 \ldots p6-1}$. The weighting takes place generally by multiplicative application with the assigned weighting factors $v_{0 \ldots p7-1.0 \ldots p6-1}$, but may also apply the values of the input variable vector in other ways.

An offset value $O_0 \ldots O_{p6-1}$ is applied, in particular, additively applied, to the result of the sum of the weighted values of the input variable vector $ut_0 \ldots ut_{p6-1}$. The result is transformed with a predefined activation function "act". The result obtained is a corresponding value of an output variable vector $y_0 \ldots y_{p6-1}$. A broader degree of freedom for the modeling exists due to the provision of the offset value $O_0 \ldots O_{p6-1}$ for each neuron 20.

By establishing the control variable p6, it is possible to adjust the number of neurons 20 of the neuron layer to be calculated. A multi-layer perceptron model may be used as an input variable vector for a calculation of a following neuron layer in model calculation unit 22 by using the values of output variable vector $y_0 \ldots y_{p6-1}$ of a neuron layer, so that the number of the neuron layers of the multi-layer perceptron model may be implemented by repeatedly calling up the function according to the aforementioned pseudocode or by repeatedly calling up model calculation unit 22.

An input transformation and/or output transformation of the input variables of the input variable vector or the output variables of the output variable vector may be undertaken with the aid of the standardization variables p1 and p2, respectively p4 and p5 predefined for each neuron 20.

The layered calculation of the MLP model allows for a model calculation unit 22 with a slim configuration, so that its surface requirement in an integrated configuration is minimal. Model calculation unit 22 nevertheless enables a calculation of a multi-layer perceptron model in a simple manner by recycling or redefining the values of the output variables of the output variable vector as input variables of an input variable vector for the calculation of an additional neuron layer.

One of multiple activation functions may be provided as activation function "act", which may be calculated by activation function calculation block 14 of model calculation unit 22. A bend function, a tangent hyperbolicus function, a sigmoid function or a linear function, for example, may be used as activation functions, as correspondingly depicted in FIGS. 4a through 4d. The type of the above described activation function may be selected with cfg_activation_function=0 . . . 3.

The calculation of a sigmoid function for the perceptron model may be shown, for example by variable value cfg_activation_function=2. The sigmoid function is defined as $$y = \frac{1}{1 + \exp(-x)}$$

Such a calculation results in a significant calculation effort due to the included exponential function and to the division, in particular, since this often takes place in a loop calculation. In order to avoid the division, the negative range of the exponential function may be mirrored during the calculation of a simplified sigmoid function, in order to provide a complete solution range for the sigmoid function. This allows the division to be dispensed with and only the exponential function to be used for negative functional values. With this approximation of the sigmoid function, it is possible to carry out the calculation in a simple manner.

The simplified sigmoid function may be carried out, for example, by the following pseudocode. In this pseudocode, it is provided that a sign of the input value x on which the sigmoid function is to be applied is ascertained. This represents a simple operation and in the floating point format, the sign bit may be used for this operation.

```
if (cfg_activation_function==2)
{
  y1 = exp(-|x|*log(2));
  y2 = -sgn(x)*y1;
  y3 = sgn(x)<0 ? 0 : 1;
  e = y3 + 0.5*y2;
}
``` sgn(x)=−1 standing for x<0 and sgn(x)=+1 standing for x≥0. In a floating point representation (MSB=sign bit, then exponent bits and mantissa bits), in particular, a sign bit of 0 corresponds to a positive value 1 and to a negative value, so that this sign bit may be used directly as y3 or as a control bit for the multiplexer (see FIG. 5).

Figure 5:
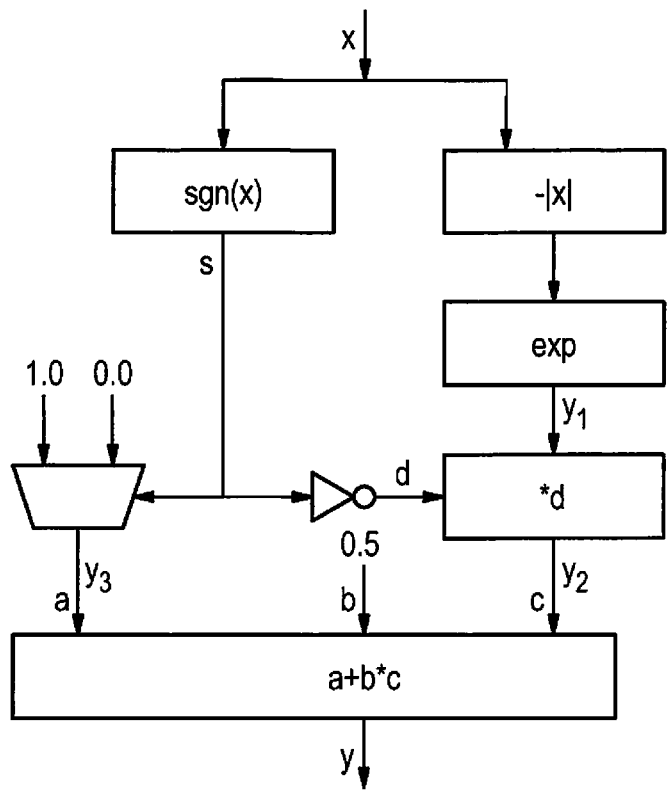
FIG. 5 shows an illustration of the processing sequence for calculating the simplified sigmoid function.

The processing sequence is graphically illustrated in FIG. 5.

To use only the functional value range of the exponential function for negative arguments, an absolute value of the argument of the exponential function is formed and this absolute value is subsequently negated.

Next, the sign of the input value is applied inversely to the result of the exponential function in order to complete the zero-point mirroring. This may be carried out most easily by calculating bitwise sign s of input value x (0 for x≥0 and 1 for 1<0) and the sign of the result of the exponential function via an exclusively-OR operation. Since the result of the exponential function is always positive or its sign is always 0, this operation may be carried out by simple negation of sign s.

The result of the zero-point mirroring is multiplied by a constant value of 0.5 and subsequently acted on by the step function (0 if negative, otherwise 1).

Alternatively, the sign manipulation of the result of the exponential function may be replaced by specifying a factor of −0.5 or +0.5 as a function of sign information s of the input value, so that the sign change of the result of the exponential function may be dispensed with. The result of the exponential function is then multiplied by the factor and subsequently added up by the step function.

Alternatively, the sign manipulation may be replaced via operation selection of the MAC block by carrying out an addition (a+b*c) or a subtraction (a−b*c) as a function of sign s.

In the aforementioned pseudocode, input value x is initially multiplied by a constant value of log(2). Constant log(2) may be integrated into the input values during the model training phase, in order in a simple manner to bring the sigmoid function to the same output variable as the original sigmoid function. Thus, the multiplication by constant log(2) may be eliminated. Alternatively, the multiplication by constant log(2) may be retained in order to avoid the scaling during the model training phase.

Figure 6:
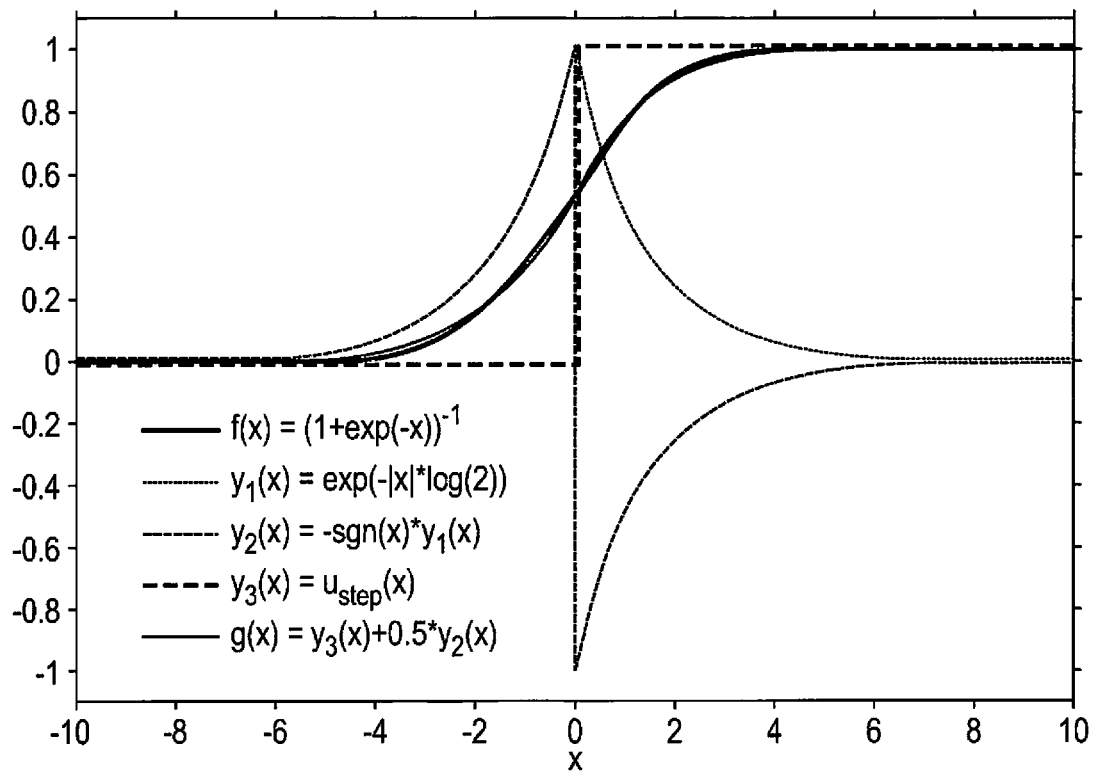
FIG. 6 shows a graphic representation of the individual functional components for calculating the simplified sigmoid function.

The individual components for calculating the simplified sigmoid function are graphically depicted in FIG. 6, e corresponding to function g(x). The approximation of the sigmoid function according to the aforementioned pseudocode to the actual course of the sigmoid function is apparent. It was found that when using the accelerated calculation of the sigmoid function for a perceptron model, no detectable inaccuracies of the perceptron model arose.

The perceptron model may also be calculated, for example, using a tan h function in the case of cfg_activation_function=3.

The tan h function corresponds mathematically to $$y = 1 - \frac{2}{1 + \exp(2x)}$$

Similarly, a simplified tan h function may be calculated according to the following pseudocode.

```
if (cfg_mlp==3)
{
    y1 = exp(-|x|/log(2));
    y2 = -sgn(x)*y1;
    y3 = sgn(x);
    e = y3 + y2;
}
```

Figure 7:
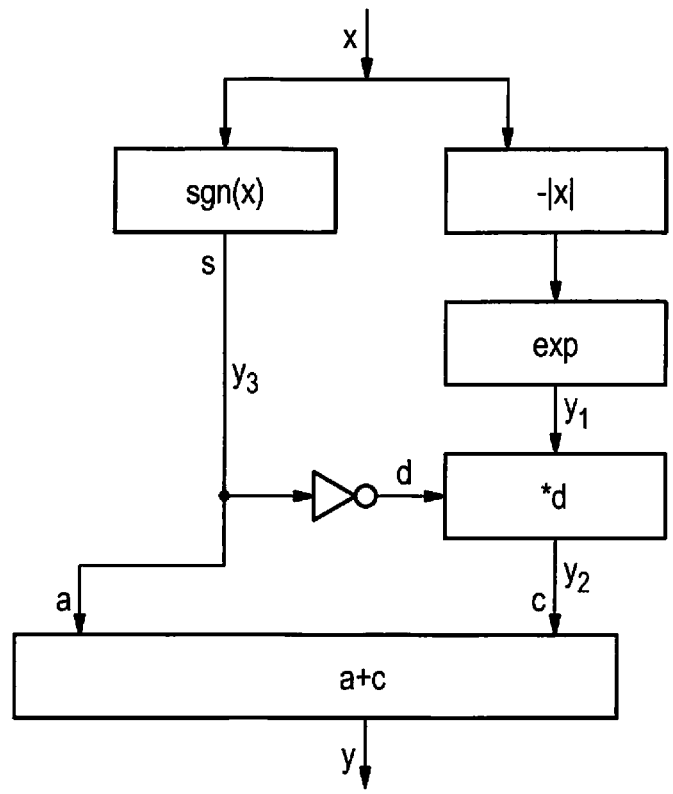
FIG. 7 shows an illustration of the processing sequence for calculating the simplified tan h function.

This function is also calculated in a manner similar to the aforementioned simplified sigmoid function, the multiplication factor of the concluding multiplication function and addition function being "1" instead of "0.5". The processing sequence is graphically illustrated in FIG. 7.

In this case, the MAC block may be replaced merely by an addition block. Alternatively, it is possible to dispense with the assignment of the sign, similar to the sigmoid function described above, and use −1 and +1 for the multiplication or to also replace it via an operation selection of the MAC block.

Figure 8:
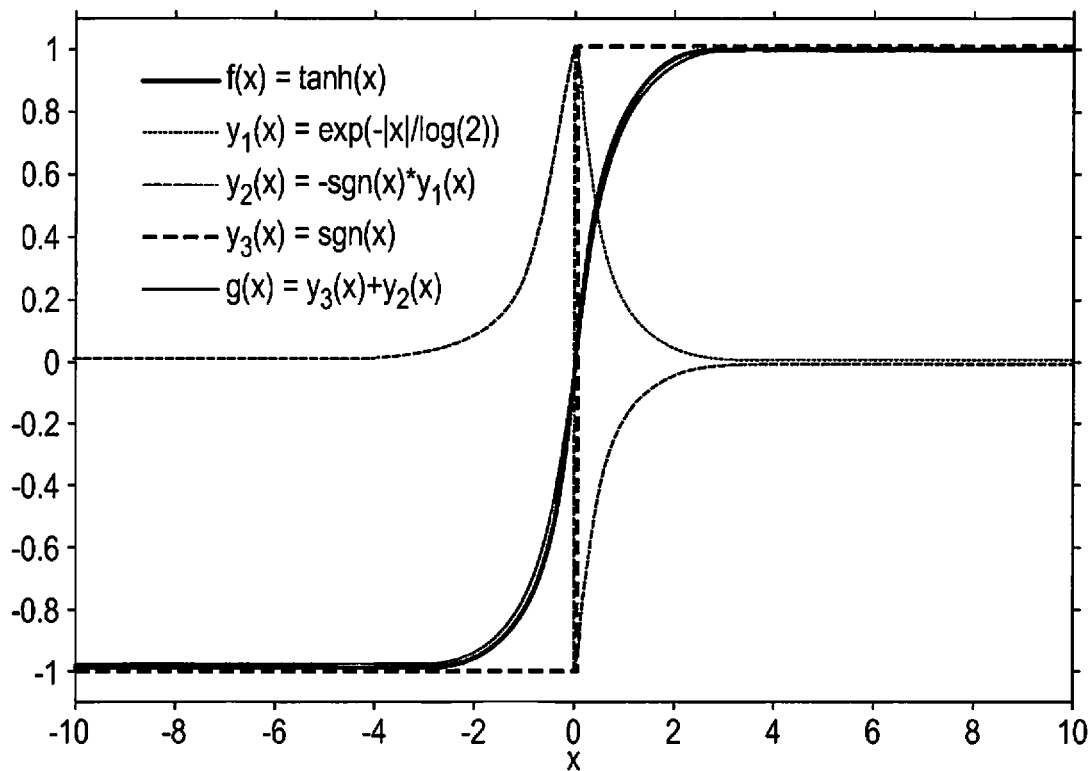
FIG. 8 shows a graphic representation of the individual functional components for calculating the simplified tan h function.

The course of the tan h function and of the functional components specified in the pseudocode and of the simplified tan h function is depicted in FIG. 8, e corresponding to function g(x).

In the aforementioned pseudocode, input value x is initially multiplied by a constant value of 1/log(2). Constant 1/log(2) may be integrated for the input values during the model training phase, in order in a simple manner to bring the tan h function to the same output value as the original tan h function. Thus, the multiplication by constant 1/log(2) is no longer necessary. Alternatively, the multiplication by constant 1/log 2) may be retained in order to avoid a scaling during the model training phase.

The use of the approximated activation function is possible for the use in perceptron models without adversely affecting the modeling accuracy. The calculation of the activation function described above further represents a significant acceleration compared to the otherwise usual calculation of the functional values of the sigmoid or tan h functions. This is successful, in particular, due to the fact that a complex division may be avoided.

What is claimed is:

1. A method for determining a neuron layer of a multi-layer perceptron model, the method comprising:
   determining a neuron of a neuron layer of the multi-layer perceptron model with the aid of an activation function, wherein the activation function corresponds to a simplified sigmoid function and to a simplified tan h function, and wherein the activation function is configured to calculate the simplified sigmoid function and the simplified tan h function using zero-point mirroring of the negative definition range of the exponential function;
   wherein the multi-layer perceptron model includes a permanently hardwired processor core configured in hardware for determining a permanently predefined processing algorithm in coupled functional blocks;
   wherein the activation function selects, based on a variable, between calculating the simplified sigmoid function and calculating the tan h function.

2. The method of claim 1, wherein an output variable is determined for each neuron for a neuron layer of the perceptron model that includes a number of neurons as a function of one or of multiple input variables of an input variable vector, of a weighting matrix having weighting factors and of an offset value predefined for each neuron, a sum of the values of the input values weighted with a weighting factor determined by the neuron and the input variable being acted on by the offset value predefined for the neuron, and the result being transformed with the activation function to obtain the output variable for the neuron.

3. The method of claim 1, wherein the activation function determines for a value a functional value of the simplified sigmoid function by applying the exponential function to a negative absolute value of the value, wherein in a case of a positive sign of the value, the functional value being determined as a sum of: "1" and of the product of: (i) "−0.5", and (ii) the result of the exponential function applied to the negative absolute value of the value, and in the case of a negative sign of the value as the product of: (i) "0.5", and (ii) the result of the exponential function applied to the negative absolute value of the value.

4. The method of claim 1, wherein the activation function determines for a value a functional value of the simplified tan h function by applying the exponential function to a negative absolute value of the value, the functional value being determined, for a positive sign of the value, as a sum of: (i) "1", and (ii) the negative result of the exponential function applied to the negative absolute value of the value, and, for a negative sign of the value, as the product of: (i) "−1", and (ii) the result of the exponential function applied to the negative absolute value of the value.

5. The method of claim 3, wherein the sign of the value is ascertained by reading out a sign bit of the value or as +1 for positive values and −1 for negative values.

6. A model calculation unit for determining a neuron layer of a multi-layer perceptron model, comprising:
   a permanently hardwired processor core configured in hardware for determining a permanently predefined processing algorithm in coupled functional blocks;
   wherein the processor core is configured to determine an output variable for each neuron for a neuron layer of a multi-layer perceptron model having a number of neurons as a function of one or multiple input variables of an input variable vector, of a weighting matrix having weighting factors and of an offset value predefined for each neuron, a sum of the values of the input values weighted with a weighting factor determined by the neuron and the input variable and with the offset value predefined for the neuron being determined for each neuron, and the result being transformed with an activation function to obtain the output variable for the neuron, the activation function including a simplified sigmoid function and a simplified tan h function, the activation function being configured to calculate the simplified sigmoid function and the simplified tan h function using zero-point mirroring of the negative definition range of the exponential function;

wherein the activation function selects, based on a variable, between calculating the simplified sigmoid function and calculating the tan h function.

7. The model calculation unit of claim 6, wherein the processor core includes a state machine and one or multiple processing operation blocks, which includes predefined offset values for each neuron, and the output variables for each neuron.

8. The model calculation unit of claim 6, wherein the processor core is formed in a surface area of an integrated chip.

9. A control unit, comprising:
a microprocessor; and
at least one model calculation unit, wherein the model calculation unit is for determining a neuron layer of a multi-layer perceptron model, including:
a permanently hardwired processor core configured in hardware for determining a permanently predefined processing algorithm in coupled functional blocks;
wherein the processor core is configured to determine an output variable for each neuron for a neuron layer of a multi-layer perceptron model having a number of neurons as a function of one or multiple input variables of an input variable vector, of a weighting matrix having weighting factors and of an offset value predefined for each neuron, a sum of the values of the input values weighted with a weighting factor determined by the neuron and the input variable and with the offset value predefined for the neuron being determined for each neuron, and the result being transformed with an activation function to obtain the output variable for the neuron, the activation function including a simplified sigmoid function and a simplified tan h function, the activation function being configured to calculate the simplified sigmoid function and the simplified tan h function using zero-point mirroring of the negative definition range of the exponential function;
wherein the activation function selects, based on a variable, between calculating the simplified sigmoid function and calculating the tan h function.

10. The control unit of claim 9, wherein the control unit is configured as an integrated circuit.

11. The control unit of claim 9, wherein the control unit is configured for controlling an engine system in a motor vehicle.

12. The model calculation unit of claim 6, wherein the processor core includes a state machine and one or multiple processing operation blocks, in particular, a MAC block and an activation function calculation block and, in particular, a memory for storing the one or multiple input variables of the input variable vector, the weighting matrix, which includes predefined offset values for each neuron, and the output variables for each neuron.

13. The model calculation unit as recited in claim 6, wherein the activation function is configured to determine for a value x a functional value, of the simplified sigmoid function or of the simplified tan h function, by applying the exponential function to a negative absolute value of the value −|x|.

14. The control unit as recited in claim 9, wherein the activation function is configured to determine for a value x a functional value, of the simplified sigmoid function or of the simplified tan h function, by applying the exponential function to a negative absolute value of the value −|x|.

15. The model calculation unit as recited in claim 6, wherein the activation function is configured to determine for a value a functional value of the simplified sigmoid function by applying the exponential function to a negative absolute value of the value, wherein:
in a case of a positive sign of the value, the activation function is configured to determine the functional value as a sum of "1" and of the product of: (i) "−0.5", and (ii) a result of the exponential function applied to the negative absolute value of the value, and
in the case of a negative sign of the value, the activation function is configured to determine the functional value as the product of: (i) "0.5", and (ii) the result of the exponential function applied to the negative absolute value of the value.

16. The control unit as recited in claim 9, wherein the activation function is configured to determine for a value a functional value of the simplified sigmoid function by applying the exponential function to a negative absolute value of the value, wherein:
in a case of a positive sign of the value, the activation function is configured to determine the functional value as a sum of "1" and of the product of: (i) "−0.5", and (ii) a result of the exponential function applied to the negative absolute value of the value, and
in the case of a negative sign of the value, the activation function is configured to determine the functional value as the product of: (i) "0.5", and (ii) the result of the exponential function applied to the negative absolute value of the value.

17. The model calculation unit as recited in claim 6, wherein the activation function is configured to determine for a value a functional value of the simplified tan h function by applying the exponential function to a negative absolute value of the value, wherein:
in the case of a positive sign of the value, the activation function is configured to determine the functional value as a sum of: (i) "1", and (ii) a negative result of the exponential function applied to the negative absolute value of the value, and
in the case of a negative sign of the value, the activation function is configured to determine the functional value as the product of: (i) "−1", and (ii) a result of the exponential function applied to the negative absolute value of the value.

18. The method as recited in claim 1, wherein the activation function selects, based on the variable, between: calculating the simplified sigmoid function, calculating the tan h function, calculating a bend function.

19. The method as recited in claim 1, wherein the activation function selects, based on the variable, between: calculating the simplified sigmoid function, calculating the tan h function, calculating a linear function.

20. The control unit as recited in claim 9, wherein the activation function is configured to determine for a value a functional value of the simplified tan h function by applying the exponential function to a negative absolute value of the value, wherein:

in the case of a positive sign of the value, the activation function is configured to determine the functional value as a sum of: (i) "1", and (ii) a negative result of the exponential function applied to the negative absolute value of the value, and in the case of a negative sign of the value, the activation function is configured to determine the functional value as the product of: (i) "−1", and (ii) a result of the exponential function applied to the negative absolute value of the value.

\* \* \* \* \*